United States Patent
Baranowski et al.

(10) Patent No.: US 6,658,267 B1
(45) Date of Patent: Dec. 2, 2003

(54) INTEROPERABLE AM/FM HEADSET WIRELESS TELEPHONE DEVICE

(75) Inventors: Robert Baranowski, San Diego, CA (US); Roger William Berg, Carlsbad, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/512,799

(22) Filed: Feb. 25, 2000

(51) Int. Cl.$^7$ ................................. H04B 1/38
(52) U.S. Cl. ........................ 455/556; 455/344
(58) Field of Search .............. 455/39, 556, 277.1, 455/557, 344, 345, 346, 568, 569, 553; 379/430, 56.3; 381/300, 23.1, 309, 311

(56) References Cited

U.S. PATENT DOCUMENTS

| | | | |
|---|---|---|---|
| 4,591,661 A | * | 5/1986 | Benedetto et al. .......... 455/556 |
| 5,590,417 A | | 12/1996 | Rydbeck |
| 5,721,783 A | * | 2/1998 | Anderson .................... 381/328 |
| 5,867,223 A | * | 2/1999 | Schindler et al. ........... 348/552 |
| 5,963,872 A | * | 10/1999 | Stein .......................... 455/557 |
| 5,978,689 A | | 11/1999 | Tuoriniemi et al. |
| 5,991,637 A | | 11/1999 | Mack, II et al. |
| 6,006,115 A | | 12/1999 | Wingate |
| 6,285,867 B1 | * | 9/2001 | Boling et al. ............... 455/404 |
| 6,519,448 B1 | * | 2/2003 | Dress et al. .................. 455/41 |

\* cited by examiner

*Primary Examiner*—Nay Maung
*Assistant Examiner*—Niik Corsaro
(74) *Attorney, Agent, or Firm*—Rader, Fishman & Grauer PLLC; Ronald P. Kananen, Esq.

(57) ABSTRACT

An AM/FM radio receiver is integrated with a wireless phone unit. Preferably, a wireless headset communicates with the integrated unit to selectively provide both commercial radio audio and wireless telephony. A microphone unit allows the user to conduct a wireless telephone call from the headset.

14 Claims, 3 Drawing Sheets

INTEROPERABLE AM/FM HEADSET WIRELESS TELEPHONE DEVICE

FIELD OF THE INVENTION

The present invention relates to the fields of consumer wireless communications and consumer electronic audio products. Specifically, the present invention relates to the fields of wireless telephony and AM/FM radio. More specifically, the present invention relates to the field of wireless headsets for portable electronic devices such as wireless and cellular telephones, where the headset can be used for both listening to audio programming and interfacing with a wireless or cordless telephone unit.

BACKGROUND OF THE INVENTION

Wireless electronic products provide users with tremendous freedom. For example, with portable radio tuners, users can listen to their favorite music or other audio programming in their cars, while exercising or virtually anywhere. Similarly, wireless telephones allow subscribers to make and receive telephone calls from virtually any location within a service area. As a result subscribers can, for example, make use of time spent traveling to conduct telephone calls and need never waste time looking for a phone to place a call.

An emerging technology allows headphones to wirelessly receive an audio signal from an audio signal source without a wire-line connection to the audio signal source. This allows the user to move around freely within a range of the audio signal source and still enjoy the audio programming being provided through the headphones.

In another field, cordless and wireless telephony similarly allow users to make and receive telephone calls from anywhere within a range of the cordless base set or within a wireless service area. Some cordless phones also make use of a headset. For example, a headset, e.g., a pair of headphones or an ear-piece secured to or on one the user's ears, may be wired to a cordless telephone handset to allow the wearer to hear the incoming audio signal of a phone call. A microphone mounted on the headset allows the user to speak in response and, thereby, conduct a telephone call. The same arrangement may be available with a wireless or cellular telephone handset.

The use of headsets for listening to audio programming and for conducting wireless or cordless telephone calls have now converged. In a related patent application, U.S. Ser. No. 08/950,833, filed Oct. 15, 1997 (incorporated herein by reference in its entirety), it was suggested that a single pair of headphones could be used for both enjoying audio programming from an audio signal source and conducting a cordless telephone call. However, problems remain integrating, into a single pair of headphones, the functions of providing high quality audio programming and conducting a telephone call. For example, when conducting a telephone call, the user must be provided with a microphone into which he or she can speak.

In light of these difficulties, consumers are typically presented with mutually exclusive sets of portable electronic wireless products. Users that want the functionality of an AM/FM tuner and a wireless phone must buy two separate products, and the user must manage which of these products is currently active. For example, when listening to an FM radio station with a headset connected to an AM/FM radio tuner and a telephone call is received, the user must remove the headset and bring the telephone unit up to his or her ear and mouth to conduct the phone call conversation. Similarly, if a user has finished a phone call and wants to listen to music or other audio programming, he or she must put away the telephone unit and place the headset for the radio tuner on his or her head.

Consequently, there is a need in the art for a system and method of more conveniently providing users with the functionality of both a radio tuner and a wireless telephone unit without requiring user effort to manage and switch between two entirely separate devices.

SUMMARY OF THE INVENTION

It is an object of the present invention to meet the above-described needs and others. Specifically, it is an object of the present invention to provide a system and method of more conveniently providing users with the functionality of both a radio tuner and a wireless telephone unit. Additionally, it is a further object of the present invention to provide such a system without requiring that the user manage and switch between the use of two entirely separate devices.

Additional objects, advantages and novel features of the invention will be set forth in the description which follows or may be learned by those skilled in the art through reading these materials or practicing the invention. The objects and advantages of the invention may be achieved through the means recited in the attached claims.

The present invention may be described as an integrated commercial radio receiver and wireless telephone device. The invention may be embodied as a phone unit including a broadband AM/FM radio signal receiver; a wireless telephone transceiver for communicating with a wireless telephone system; and a transmitter for selectively transmitting a commercial radio signal from the radio signal receiver or an incoming audio signal of a wireless telephone call to a headset unit. Preferably, the transmitter is a wireless FM radio transmitter.

The headset unit preferably includes a microphone for transducing spoken utterances of a user as an outgoing audio signal of the wireless telephone call; and a transceiver for transmitting the outgoing audio signal to the wireless telephone transceiver for transmission to the wireless telephone system as part of a wireless telephone call. Preferably, the headset unit includes an FM demodulator for demodulating the FM signal transmitted from the transmitter of the phone unit. Additionally, the headset unit preferably includes a stereo decoder for decoding the commercial radio signal transmitted by the phone unit, when the commercial radio signal is in stereo.

The phone unit may also include a user input device for selecting the commercial radio station that is tuned by the radio receiver. The user input device may also be used to control the frequency at which the transmitter of the phone unit communicates with the headset unit.

The present invention also encompasses the method of making and operating the device described above. For example, the method of the present invention encompasses integrating a commercial radio receiver and a wireless telephone device into a common unit by providing a broadband AM/FM radio signal receiver and a wireless telephone transceiver for communicating with a wireless telephone system within a single unit.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained. Under the principles of the present invention, a commercial radio receiver and a wireless telephone are integrated into a single unit. While this can be accomplished for purposes of the present invention using entirely separate circuits for the radio receiver and telephone transceiver functions, the present invention also provides a preferred method and apparatus in which circuitry is shared between the phone and the radio receiver to render the device as compact and efficient as possible.

Figure 1:
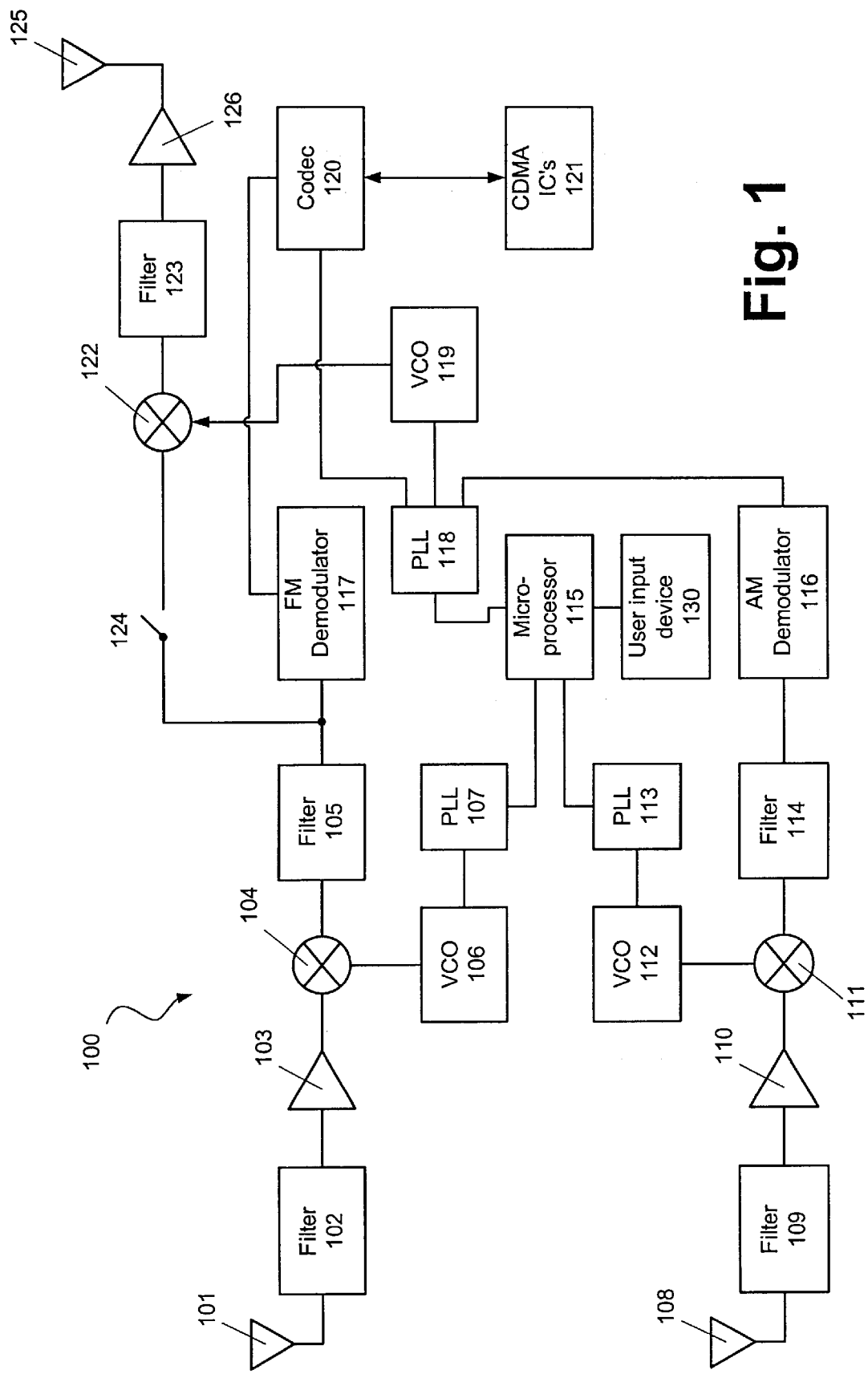
FIG. 1 is a block diagram of a wireless phone unit according to the present invention.
Figure 2:
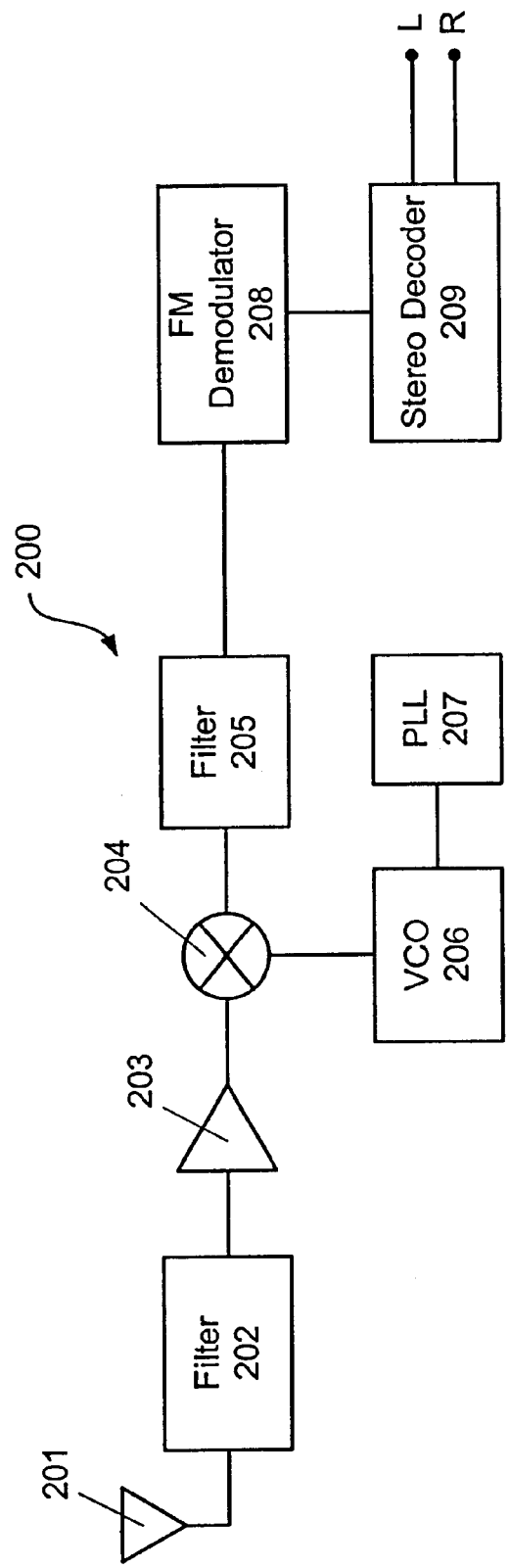
FIG. 2 is a block diagram of a headset according to the present invention.

As shown in FIGS. 1 and 2, the invention includes a phone unit (100; FIG. 1) and a headset unit (200; FIG. 2). The phone unit (100) is preferably a wireless telephone unit that receives wireless telephone calls. The phone unit (100) also receives commercial broadband AM (Amplitude Modulation) and FM (Frequency Modulation) radio signals via a broadband AM/FM receiver.

The phone unit (100) wirelessly transmits a wireless telephone signal or a radio signal selectively to the headset unit (200). Consequently, with the headset unit (200), a user can listen to a radio broadcast or conduct a wireless telephone call.

As illustrated in FIG. 1, the phone unit (100) has an input signal path for receiving both FM and AM commercial broadcasts. An FM antenna (101) receives radio signals transmitted in the FM range, i.e., 87.5 and 107.9 MHz. A filter (102) filters the incoming signal. A low noise amplifier (103) then amplifies the FM signal. Similarly, an AM antenna (108) receives AM radio signals transmitted in the AM range, i.e., 530 and 1700 KHz. A filter (109) filters the incoming AM signal, and a low noise amplifier (110) amplifies the signal. While the AM and FM signal reception paths are illustrated separately in FIG. 1, it will be understood by those in the art, that a single antenna and a single input signal path could be used to receive both AM and FM signals.

In order to receive a particular AM signal, the user operates a user input device (130) to tune the AM receiver. The user input device (130) may include a switch, a keypad, a series of buttons, a dial or any other device with which the user can indicate his or her desired signal selection. The user input device (130) is connected to a microprocessor (115) which receives a signal from the user input device (130) indicating the AM station. The microprocessor (115) controls a phase locked loop circuit (113) appropriately to drive a voltage controlled oscillator (112) at the appropriate frequency.

The signal from the oscillator (112) is fed to a mixer (111) and multiplied with the incoming AM radio signal. The output of the mixer (111) is a modulated intermediate frequency (IF) signal for the AM radio station designated by the user through the user input device (130). This signal is filtered in filter (114) and then demodulated in an AM demodulator or envelope detector (116).

The result is a baseband signal that is used to control or modulate the output of a voltage controlled oscillator (119). The oscillator (119) is driven by a phase locked loop circuit (118) to produce an FM carrier signal at a frequency of preferably 400 MHz or more used to communicate from the phone unit (100) to the headset unit (200). Alternatively the frequency used to communicate from the phone unit (100) to the headset unit (200) could be less than 400 MHz, for example in the FM broadcast band (100 MHz). The baseband signal from the AM demodulator (116) is used to modulate the output of the oscillator (119) to provide a modulated FM signal carrying the audio of the desired AM radio station.

This signal is passed through a mixer (122) to a filter (123) and amplifier (126). The amplifier (126) is connected to an antenna for transmitting the signal at the designated FM frequency to the headset unit (200) of FIG. 2. As will be described in more detail below, the headset (200) receives the FM signal from the phone unit (100) and tranduces the signal through the speakers of the headset (200) so that the user can listen to the designated AM radio station.

A similar signal path allows the user to listen to a broadcast FM radio signal. Again, the user inputs an indication of the frequency of the FM station he or she wishes to listen to with the user input device (130). The user input device (130) accordingly signals the microprocessor (115) which drives a phase locked loop circuit (107) accordingly.

The phase locked loop circuit (107) controls a voltage controlled oscillator (106) to output an appropriate signal to a mixer (104). The mixer (104) mixes the output of the oscillator (106) with the incoming FM signal from the amplifier (103). In this way, the mixer (104) tunes the signal for the particular FM radio station the user has designated through the user input device (130). The output of the mixer (104) is a modulated IF signal for the particular FM radio station selected by the user.

When the user has used the user input device (130) to select reception of a commercial broadcast FM signal and designated the station to be received, the switch (124) is closed. Consequently, the IF signal output by the mixer (104) is filtered by the filter (105) and then passed to the mixer (122).

The microprocessor (115) drives the phase locked loop circuit (118) to control the oscillator (119) to output a signal which is at the FM frequency, e.g., 400 MHz or more, that is used to communicate from the phone unit (100) to the headset (200) minus the intermediate carrier frequency of the incoming FM radio signal when output by the mixer (104).

This oscillator signal from the oscillator (119) is mixed with the IF signal from the mixer (104) by the mixer (122). The output of the mixer (122) is then filtered (123), amplified (126) and transmitted to the headset (200) via the antenna (125).

As shown in FIG. 2, an FM antenna (201) is used to receive the signal transmitted from the phone unit (100). The incoming signal is filtered in a filter (202) and amplified by a low-noise amplifier (203). The signal at the frequency used for communication from the phone unit (100) to the headset unit (200), e.g., 400 MHz or more, is tuned using the mixer (204) and voltage controlled oscillator (206). A phase locked loop circuit (207) controls the oscillator (206).

The output of the mixer (204) is a modulated FM signal that may be carrying an AM or FM radio station received by the phone unit (100) as described above. The output of the mixer (204) is again filtered in a filter (205) before being demodulated in a broadband FM demodulator (208).

Because all broadband FM demodulation occurs in the headset unit (200), significant savings in broadband FM demodulation hardware are achieved. This off-loading of demodulation responsibility from the phone unit (100) to the headset unit (200) results in the two units sharing circuit functionality. Doing so eliminates the redundancy of having duplicate broadband FM demodulation hardware, thereby reducing the size and cost of the phone unit (100).

The output of the demodulator (208) is provided to a stereo decoder (209) to separate the left and right audio signals, if present. If the incoming signal is mono and not stereo, the decoder (209) outputs the signal on both left (L) and right (R) channels.

The left (L) and right (R) channel signals are provided to speakers (not shown) that are worn at the user's ears. Through the speakers, the user can listen to either the AM or FM radio station indicated using the user input device (130), received by the phone unit (100) and transmitted wirelessly to the headset (200). In the preferred embodiment the communication between the phone unit (100) and the headset (200) is wireless as described above. However, a wire connection could alternatively be provided between the phone unit (100) and the headset (200).

Having described the use of the present invention to receive a commercial AM or FM radio broadcast, the use of the invention in conducting wireless telephone calls will now be explained. An incoming wireless telephone signal is received by the code division multiple access integrated circuits (CDMA IC's) (121) of the phone unit (100). The incoming audio signal of the wireless phone call is transmitted to the codec (120). After processing by the codec (120), the incoming audio signal of the wireless telephone call is used to modulate the signal output by the voltage controlled oscillator (119). The oscillator (119) is driven by the phase locked loop circuit (118) at the carrier frequency used for communication to the headset unit (200).

The resulting modulated FM signal carries the incoming audio signal of the wireless telephone call being conducted by the user. As before, the modulated FM signal is then filtered (123), amplified (126) and transmitted to the headset (200) via the antenna (125).

Moving again to FIG. 2, the headset (200) antenna (201) receives the signal from the phone unit (100). The signal is tuned, filtered and demodulated as described above. As the incoming audio signal of the wireless phone call is not likely a stereo signal, the stereo decoder (209) outputs the same signal to both the left (L) and right (R) channels. The user is then able to hear the incoming audio of the wireless telephone call.

To fully conduct the wireless telephone call, the c user must have a microphone into which to speak in response to the incoming audio of the other party to the phone call. Under the principles of the present invention, a microphone unit, shown in FIG. 3, can be incorporated into the headset unit (200) or may be a separate unit.

If incorporated into the headset (200), the microphone may be on a moveable extension so that it can be retracted when not in use, i.e., when the user is listening to a commercial radio broadcast. For example, the microphone may be on a telescoping, collapsible, flexible or rotating extension.

Figure 3:
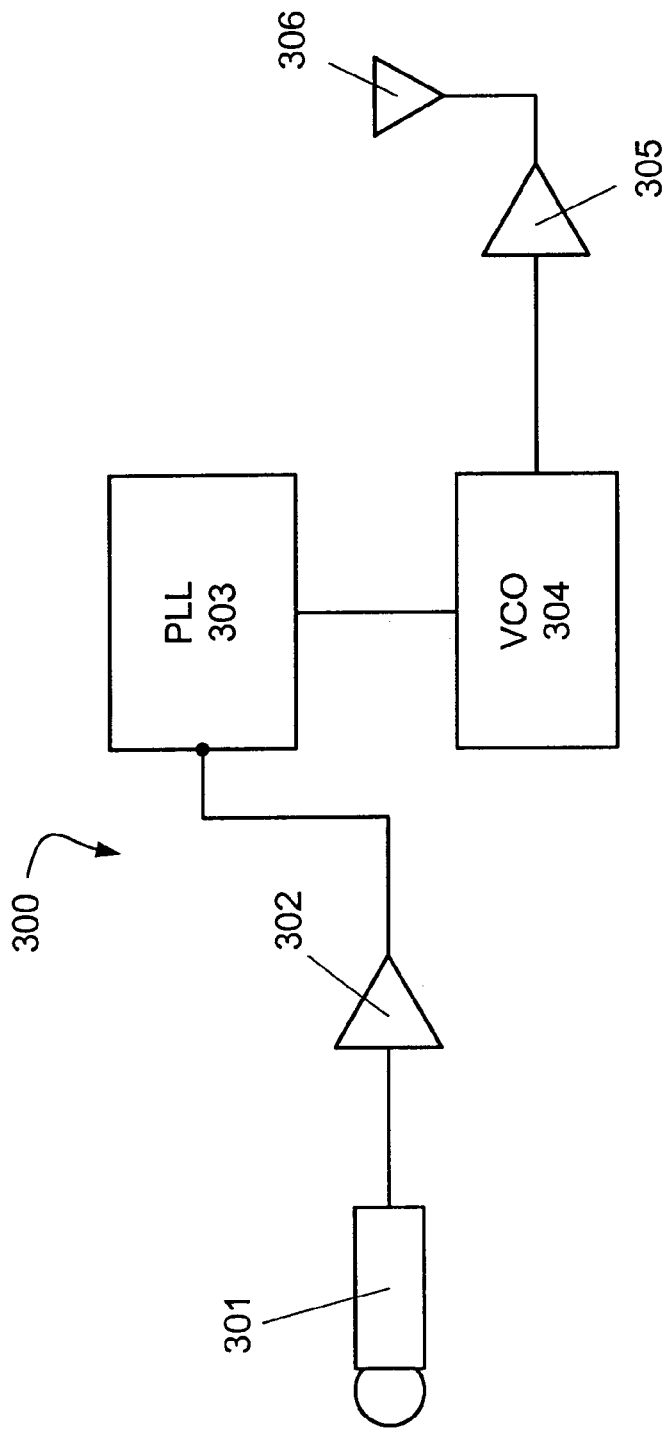
FIG. 3 is a block diagram of the wireless microphone unit according to the present invention.

The circuit of the microphone unit (300) is shown in FIG. 3. In FIG. 3, the microphone (301) transduces the spoken utterances of the user into an electronic audio signal to be used as the outgoing audio signal of a wireless telephone call. The signal is amplified in the amplifier (302) and then used to modulate the output of a voltage controlled oscillator (304) which is being driven by a phase locked loop (303). The phase locked loop (303) drives the oscillator (304) to output a carrier wave at the frequency used for communication from the microphone unit (300) to the phone unit (100). This carrier signal is then modulated by the microphone signal.

The modulated signal is output by the oscillator (304) to an amplifier (305). The amplified signal is then transmitted via antenna (306) to the phone unit (100).

The outgoing audio of the wireless telephone call is received in the phone unit through the FM antenna (101). The signal is filtered (102) and amplified (103). The microprocessor (115) controls the phase locked loop circuit (107) to drive the voltage controlled oscillator (106) to output a signal that corresponds to the frequency used to communicate from the microphone unit (300) to the phone unit (100). When this signal is mixed with the signal from the amplifier (103) by the mixer (104), the signal from the microphone unit (300) is tuned and provided to the filter (105).

In this mode, the switch (124) is open. Thus, the signal from the microphone unit (300) is passed to an FM demodulator (117). Because the demodulator (117) is only used to demodulate signals from the microphone unit (300) it need not be an expensive broadband demodulator, but only need cover the possible range of signals used by the microphone unit (300) when transmitting to the phone unit (100).

The demodulated signal is sent from the demodulator (117) to the codec (120) and, from there, to the CDMA IC's (121). The CDMA IC's (121) transmit the microphone signal to the wireless telephone infrastructure as the outgoing audio signal of the wireless telephone call being conducted by the user.

When an incoming telephone call is received, the user can be notified by a signal from the phone unit (100) to the headset that, for example, produces a ringing or other alert sound in the speakers of the headset. The headset (200) may include a user input device, such as a switch or button (not shown) that can be actuated to activate the microphone unit (300) and take the incoming call.

Additionally, if no call is incoming and the user activates the microphone unit (300), the phone unit (100) may initiate a phone call and provide a dial tone to the speakers of the headset (200). The present invention may also include a voice recognition system with which the user can speak the name, number or designation of a party to be called into the microphone (301) and have the phone unit (100) recognize the command and place the call appropriately. Alternatively, a numeric keypad may be provided on the headphones with which the user can dial a party to be called, as well as a remote control or a keypad on the phone unit.

Additionally, the user may use the user input device (130) to specify the frequency at which the phone unit (100) and the headset unit (200) communicate. This allows the user to select a frequency that does not interfere and is not interfered with by any other transmissions or radio signal emissions in the user's area.

The user has several choices in controlling the state of the device such as whether it is receiving broadcast AM/FM radio or waiting for a telephone call with the radio off. The user will be able to use the device of the present invention in any of the following six modes:

1) radio on, phone off—maximizes phone unit battery life;
2) radio on, phone on—allows incoming calls;
3) radio on, phone in conversation—allows the user to transmit received radio into a call;

4) radio off, phone on—waiting for call only;

5) radio off, phone in conversation—conducting a normal voice call; and 6) radio off, phone off.

Some further description is needed for two of these modes, specifically numbers 2) and 3).

2) Radio On, Phone On:

This mode allows a user to listen to commercial broadband radio while monitoring for incoming telephone calls. When a telephone call is received, an audible alert can be mixed through PPL (118) and VCO (119) into the commercial radio's audio signal, thus alerting the user that a call is pending. If there is no response after the first notification, the headset unit (200) could first vibrate, via a small rotating motor with counterweigh (not shown), then sound a loud ringer not shown to try to get the user's attention in responding to the incoming call. Upon answering, the radio audio is muted, and resumes when the phone call is ended.

3) Radio On, Phone in Conversation

While in a call, a user could interrupt the audio coming from the headset microphone (300) and replace it with commercial audio from the AM/FM receiver in phone unit (100). While in this mode, the user can select to also listen to the AM/FM commercial radio in the headset speakers, or listen to the incoming telephone audio. This option could be used to place a telephone call on "hold." An additional audio notification, such as a periodic beep, can keep the user aware that a phone call is in progress but perhaps on "hold", even though AM/FM commercial audio is played in the headset speakers.

The preceding description has been presented only to illustrate and describe the invention. It is not intended to be exhaustive or to limit the invention to any precise form disclosed. Many modifications and variations are possible in light of the above teaching.

For example, the user input device (130) may be located on the headset (200) for controlling which signal (or signals) is received. The user input device (130) can, of course, also be used to control the answering or initiation of a wireless telephone call.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An integrated commercial radio receiver and wireless telephone device comprising a phone unit including:
    a broadband AM/FM radio signal receiver;
    a wireless telephone transceiver for communicating with a wireless telephone system; and
    a transmitter for selectively transmitting a commercial radio signal from said radio signal receiver or an incoming audio signal of a wireless telephone call to a headset unit,
    wherein said phone unit further comprises a user input device for selecting a commercial radio station that is tuned by said radio signal receiver,
    wherein said user input device further controls a frequency at which said transmitter communicates with said headset unit.

2. The device of claim 1, wherein said transmitter is a wireless transmitter.

3. The device of claim 1, wherein said transmitter is an FM radio transmitter.

4. The device of claim 3, wherein said headset unit comprises an FM demodulator for demodulating an FM signal transmitted from said transmitter of said phone unit.

5. The device of claim 1, wherein said headset unit comprises:
    a microphone for transducing spoken utterances of a user as an outgoing audio signal of said wireless telephone call; and
    a transceiver for transmitting said outgoing audio signal to said wireless telephone transceiver for transmission to said wireless telephone system.

6. The device of claim 1, wherein said headset unit comprises a stereo decoder for decoding said commercial radio signal transmitted by said phone unit, when said commercial radio signal is in stereo.

7. A method of integrating a commercial radio receiver and a wireless telephone device into a common unit comprising:
    providing a broadband AM/FM radio signal receiver, a wireless telephone transceiver for communicating with a wireless telephone system within a single unit, and a user input device;
    selectively transmitting a commercial radio signal from said radio signal receiver or an incoming audio signal of a wireless telephone call to a headset unit;
    said user input device selecting a commercial radio station that is tuned by said radio signal receiver and selecting a frequency at which a transmitter communicates with said headset unit.

8. The method of claim 7, wherein said transmitting is performed wirelessly.

9. The method of claim 7, wherein said step of selectively transmitting is performed with an FM radio transmitter.

10. The method of claim 9, further comprising:
    demodulating an FM signal transmitted from said FM radio transmitter with an FM demodulator of said headset unit.

11. The method of claim 7, further comprising:
    transducing spoken utterances of a user as an outgoing audio signal of said wireless telephone call with a microphone unit; and
    transmitting said outgoing audio signal to said wireless telephone transceiver for transmission to said wireless telephone system.

12. The method of claim 7, further comprising stereo decoding said commercial radio signal transmitted by said phone unit, when said commercial radio signal is in stereo, with a stereo decoder in said headset unit.

13. An integrated device having a commercial radio receiver and a wireless telephone device comprising:
    broadband receiving means for receiving commercial AM/FM radio signals;
    wireless telephone transceiver means for communicating with a wireless telephone system;
    means for selectively transmitting a commercial radio signal from said broadband receiving means or an incoming audio signal of a wireless telephone call from said wireless telephone transceiver means to a headset unit, said means for selectively transmitting including a radio transmitter;
    user input means for selecting a commercial radio station that is tuned by said radio signal receiver and a frequency at which said radio transmitter communicates with said headset, wherein said broadband receiving means and said wireless telephone transceiver means are integrated into a common unit.

14. The device of claim 13, further comprising:

means for transducing spoken utterances of a user as an outgoing audio signal of said wireless telephone call; and means for transmitting said outgoing audio signal to said wireless telephone transceiver means for transmission to said wireless telephone system.

* * * * *